(12) United States Patent
Gamble et al.

(10) Patent No.: US 9,803,784 B2
(45) Date of Patent: Oct. 31, 2017

(54) CORRUGATED PIPE GASKET

(71) Applicant: Press-Seal Gasket Corporation, Fort Wayne, IN (US)

(72) Inventors: Jimmy Dean Gamble, Avilla, IN (US); Robert Ryan Slocum, Fort Wayne, IN (US)

(73) Assignee: Press-Seal Corporation, Fort Wayne, IN (US)

( * ) Notice: Subject to any disclaimer, the term of this patent is extended or adjusted under 35 U.S.C. 154(b) by 108 days.

(21) Appl. No.: 14/630,804

(22) Filed: Feb. 25, 2015

(65) Prior Publication Data

US 2015/0240974 A1 Aug. 27, 2015

Related U.S. Application Data

(60) Provisional application No. 61/944,343, filed on Feb. 25, 2014.

(51) Int. Cl.
*F16J 15/00* (2006.01)
*F16L 25/00* (2006.01)

(52) U.S. Cl.
CPC ........... *F16L 25/0054* (2013.01); *F16J 15/00* (2013.01)

(58) Field of Classification Search
CPC ..... F16L 25/0054; F16L 25/0036; F16L 9/06; F16L 41/023; F16J 15/00
See application file for complete search history.

(56) References Cited

U.S. PATENT DOCUMENTS

| | | | |
|---|---|---|---|
| 2,953,398 A | 9/1960 | Haugen et al. | |
| 3,573,871 A | 4/1971 | Warner | |
| 4,487,421 A | 12/1984 | Housas et al. | |
| 4,641,858 A | 2/1987 | Roux | |
| 4,664,421 A | 5/1987 | Jones | |
| 5,687,976 A | 11/1997 | Andrick et al. | |
| 6,082,741 A | 7/2000 | Gregoire et al. | |
| 6,336,640 B1 | 1/2002 | Knapp | |
| 6,343,623 B2 | 2/2002 | Hegler | |
| 6,367,802 B1 | 4/2002 | Knapp | |
| 6,550,775 B2 | 4/2003 | Knapp | |
| 6,719,302 B2 | 4/2004 | Andrick | |
| 6,948,718 B2 | 9/2005 | Shaffer et al. | |
| 7,185,894 B2 | 3/2007 | Kish et al. | |
| 7,306,264 B2 | 12/2007 | Goddard et al. | |
| 7,331,582 B2 | 2/2008 | Shaffer et al. | |
| 7,469,905 B2 | 12/2008 | Knapp | |
| 7,731,884 B2 | 6/2010 | Knapp et al. | |
| 8,474,830 B2 | 7/2013 | Knapp | |
| 8,678,399 B2 | 3/2014 | Knapp | |
| D706,908 S | 6/2014 | Knapp | |

(Continued)

OTHER PUBLICATIONS

Office Action dated Mar. 16, 2016 in corresponding Canadian Application No. 2,882,908.

*Primary Examiner* — David E Bochna
*Assistant Examiner* — James A Linford
(74) *Attorney, Agent, or Firm* — Faegre Baker Daniels LLP

(57) ABSTRACT

A gasket is adapted for sealing a joint between bell and spigot ends of corrugated pipes. The gasket generally includes a pair of seal lobes which provide a redundant double seal, together with an anchoring portion sized to be received in a trough defined by the pipe corrugation and at least one anti-roll lip adapted to engage the anchoring corrugation.

19 Claims, 4 Drawing Sheets

(56) References Cited

U.S. PATENT DOCUMENTS

| | | |
|---|---|---|
| 8,834,761 B2 | 9/2014 | Knapp |
| 2003/0001343 A1* | 1/2003 | Andrick .............. F16L 25/0054 |
| | | 277/616 |
| 2004/0150170 A1 | 8/2004 | Shaffer et al. |
| 2005/0161947 A1 | 7/2005 | Skinner et al. |
| 2008/0303224 A1* | 12/2008 | Knapp ................ F16L 25/0054 |
| | | 277/627 |
| 2009/0127853 A1* | 5/2009 | Sutton ................... F16L 21/035 |
| | | 285/374 |
| 2009/0295153 A1 | 12/2009 | Knapp |
| 2010/0207386 A1 | 8/2010 | Biesenberger et al. |
| 2011/0187059 A1 | 8/2011 | Chinchilla et al. |
| 2012/0038117 A1 | 2/2012 | Knapp |
| 2012/0274031 A1 | 11/2012 | Knapp |
| 2014/0174653 A1* | 6/2014 | Babcanec ............... B32B 37/16 |
| | | 156/293 |
| 2014/0346740 A1 | 11/2014 | Knapp |

* cited by examiner

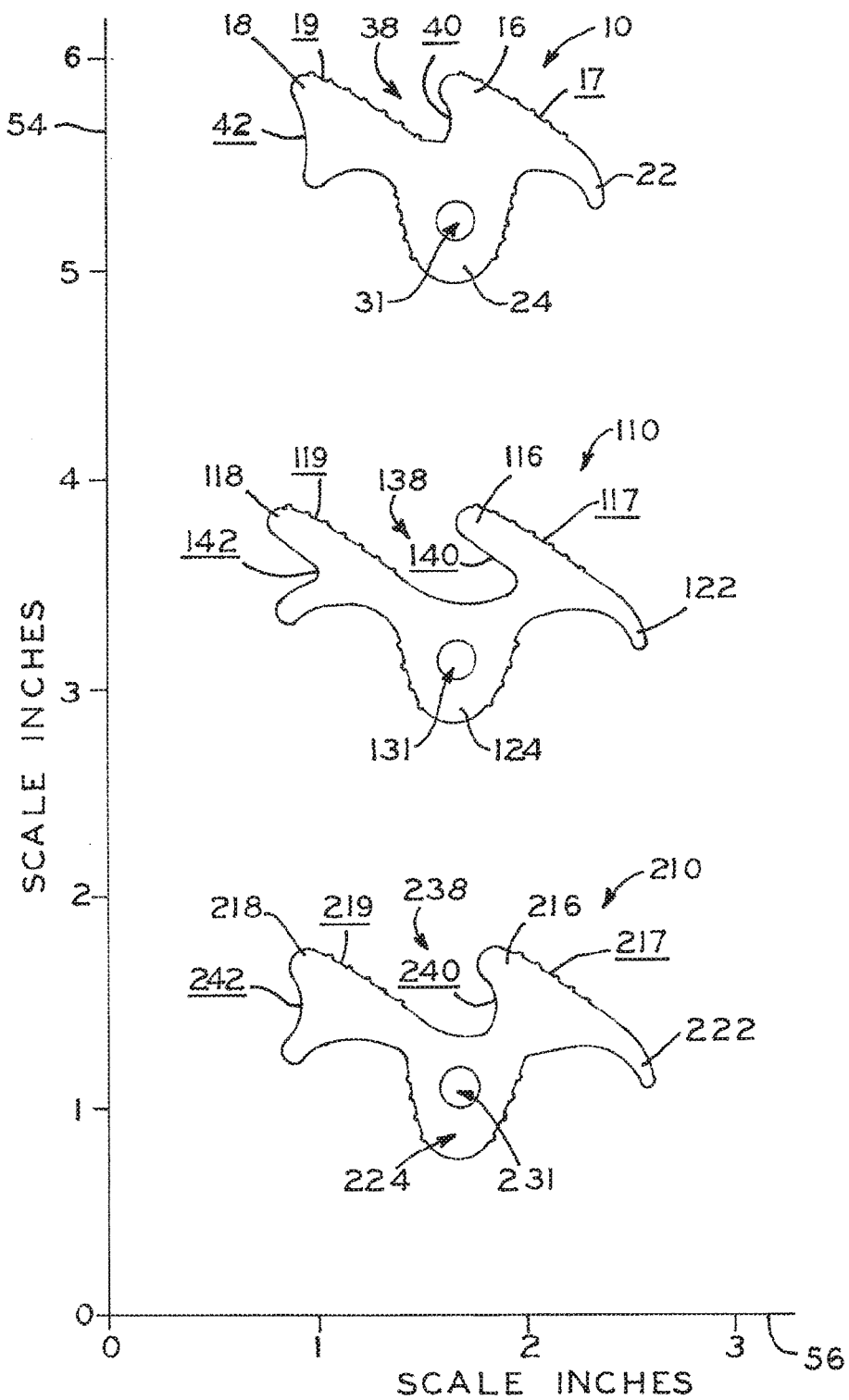
FIG_5

CORRUGATED PIPE GASKET

CROSS REFERENCE TO RELATED APPLICATIONS

This application claims priority under 35 U.S.C. §119(e) to U.S. Provisional Patent Application Ser. No. 61/944,343, entitled CORRUGATED PIPE GASKET, filed on Feb. 25, 2014, the entire disclosure of which is expressly incorporated by reference herein.

BACKGROUND

1. Technical Field

The present invention relates to a gasket for pipe-to-pipe connections, and in particular, to a gasket for connecting corrugated pipes to one another.

2. Description of the Related Art

Gaskets for connecting the spigot and bell ends of corrugated pipes are known, though suffer from drawbacks such as high friction of insertion and roll-out of the gasket from its joint upon joining the spigot and bell ends of a pipe.

What is desired is an improvement over the foregoing.

SUMMARY

The present disclosure provides a gasket adapted for sealing a joint between bell and spigot ends of corrugated pipes. The gasket generally includes a pair of seal lobes which provide a redundant double seal, together with an anchoring portion sized to be received in a trough defined by the pipe corrugation and at least one anti-roll lip adapted to engage the anchoring corrugation.

In one form thereof, the present disclosure provides an annular gasket defining perpendicular axial and radial directions and having a body including a radially outer, sealing side and a radially inner, anchoring side, the gasket including: an anchoring portion disposed at the anchoring side and extending radially inwardly, the anchoring portion sized and configured to be received in a groove of a corrugated pipe; a first seal lobe disposed at the sealing side and defining a first lobe tip at a radially outward-most point of the first seal lobe, the first lobe tip axially aligned with the anchoring portion; a second seal lobe disposed at the sealing side and defining a second lobe tip at a radially outward-most point of the second seal lobe, the second lobe tip axially rearward of the anchoring portion; and an anti-roll lip positioned forward of the first seal lobe and extending radially inwardly to the anchoring side.

In another form thereof, the present disclosure provides a pipe assembly defining perpendicular axial and radial directions, including: a pipe defining a longitudinal axis and having a spigot end with an annular corrugation, the corrugation including a front portion defining a front peak point, a rear portion defining a rear peak point, and a groove disposed between the front and rear portions and defining a nadir, the front portion defining a radius extending forwardly from the front peak portion and having a radius center defining a first radial distance from the longitudinal axis; and an annular gasket disposed on the annular corrugation, the gasket having a body formed of a resilient material and including a sealing side and anchoring side. The gasket includes: an anchoring portion disposed at the anchoring side and extending radially inwardly, the anchoring portion received in the groove of a pipe; and a first seal lobe disposed at the sealing side and defining a first lobe tip; a second seal lobe disposed at the sealing side and defining a second lobe tip, the first seal lobe and the second seal lobe axially spaced from one another to define a trough therebetween; and an anti-roll lip positioned forward of the first seal lobe and extending radially inwardly along a leading surface of the front portion of the annular corrugation to a tip, the tip of the anti-roll lip having a second radial distance from the longitudinal axis that is substantially equal to the first radial distance from the radius center to the longitudinal axis.

In yet another form thereof, the present disclosure provides a pipe assembly defining perpendicular axial and radial directions, including: a first pipe having a spigot end with an annular corrugation including a front portion defining a front peak point, a rear portion defining a rear peak point, and a groove disposed between the front and rear portions and defining a nadir; a second pipe having an annular bell end with an annular inner surface, the first pipe and the second pipe defining a gasket receiving space having a receiving space radial extent between the nadir of the groove and the annular inner surface of the annular bell end when the first pipe is assembled to the second pipe; and an annular gasket disposed on the annular corrugation, the gasket having a body formed of a resilient material and including a sealing side and anchoring side. The gasket includes: an anchoring portion disposed at the anchoring side and extending radially inwardly, the anchoring portion received in the groove of the first pipe and defining an anchoring portion radial extent; a first seal lobe disposed at the sealing side; and a second seal lobe disposed at the sealing side, the first seal lobe and the second seal lobe axially spaced from one another to define a trough therebetween, the anchoring portion radial extent substantially equal to the receiving space radial extent, whereby the first seal lobe and the second seal lobe must substantially deform and compress when the gasket is in a sealing configuration in the gasket receiving space.

BRIEF DESCRIPTION OF THE DRAWINGS

The above-mentioned and other features and advantages of this disclosure, and the manner of attaining them, will become more apparent and the invention itself will be better understood by reference to the following description of an embodiment of the invention taken in conjunction with the accompanying drawings, wherein:

FIG. 5 is an elevation view of three juxtaposed cross-sectional profiles of seals made in accordance with the present disclosure, drawn to scale.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
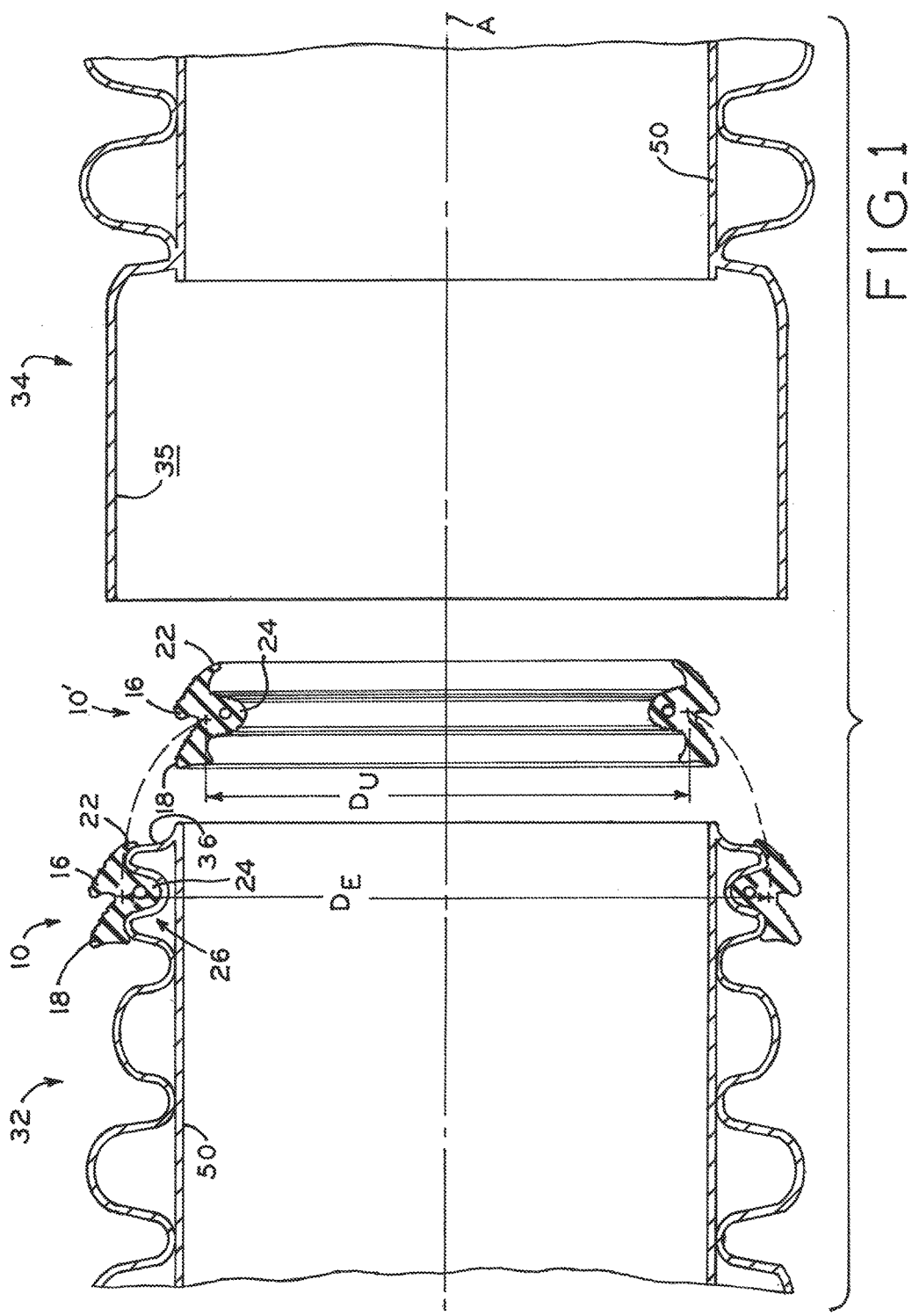
FIG. 1 is an elevation, cross-sectional view of a gasket according to the present disclosure mounted to a corrugated pipe.

Referring to FIG. 1, a cross-sectional view of a gasket 10 made in accordance with the present disclosure is shown.

Gasket 10 is generally annular in shape, and is made from an extruded material, such as rubber or a flexible plastic, for example. In an exemplary embodiment, gasket 10 is made from isoprene rubber materials such as polyisoprene (e.g., natural rubber), ethylene propylene diene monomer rubber (EPDM), neoprene rubber, nitrile rubber, thermoplastic elastomer rubber (TPE) or thermoplastic vulcanized rubber (TPV). Further exemplary materials for gasket 10 include silicone, ethylene propylene (EPM), a mixture of cross-linked EPDM rubber and polypropylene, such as SANTO-PRENE® (SANTOPRENE® is a registered trademark of the Exxon Mobil Corporation of Irving, Tex.), or any other suitable material. Typically, a gasket 10 will be extruded, cut to a desired length, and then the ends of the cut-to-length section will be fused, adhered or otherwise secured to one another to form an annular (e.g., round) shape sized and configured for mounting around the circumference of a round pipe.

Figure 4:
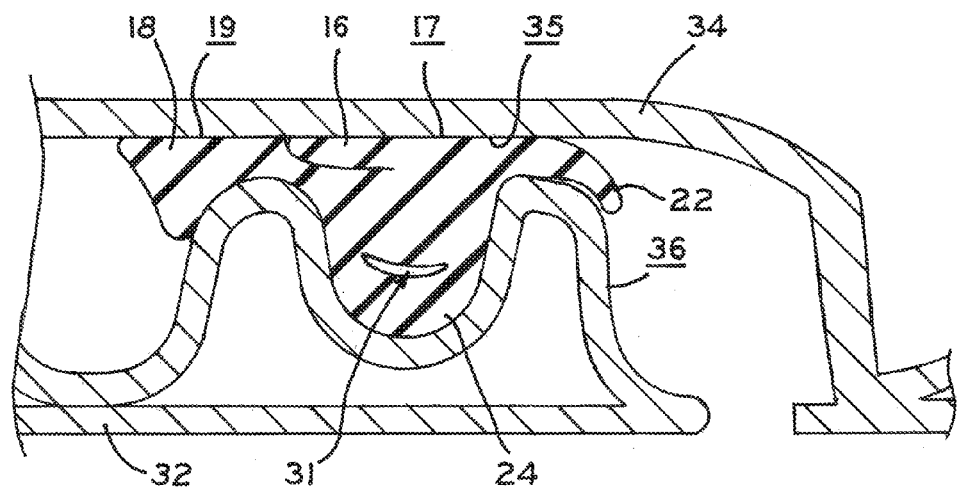
FIG. 4 is an assembled view of the corrugated pipe and gasket of FIG. 3, with the seal shown deformed in an assembled configuration between the pipe spigot and bell.

In an exemplary embodiment, gasket 10 is monolithically and integrally formed as a single piece of material having a substantially constant density throughout its cross-sectional area. Further, gasket 10 may have a shore A durometer as low as 40, 43 or 47, and as high as 49, 52 or 55, or may have any durometer within any range defined by any of the foregoing values. This represents a relatively soft and compressible durometer range in the context of corrugated pipe gaskets, such as some gaskets meeting the ASTM F447 standard (having a durometer between 40 and 70) and the durometer range for rubber materials generally (between 40 and 60). The relatively soft durometer range defined by gasket 10 enables substantial compression and deformation of gasket 10 when bell end 34 is installed to spigot end 32 of a corrugated pipe, as shown in FIG. 4 and discussed below.

1. Gasket Shape and Structure

Figure 2:
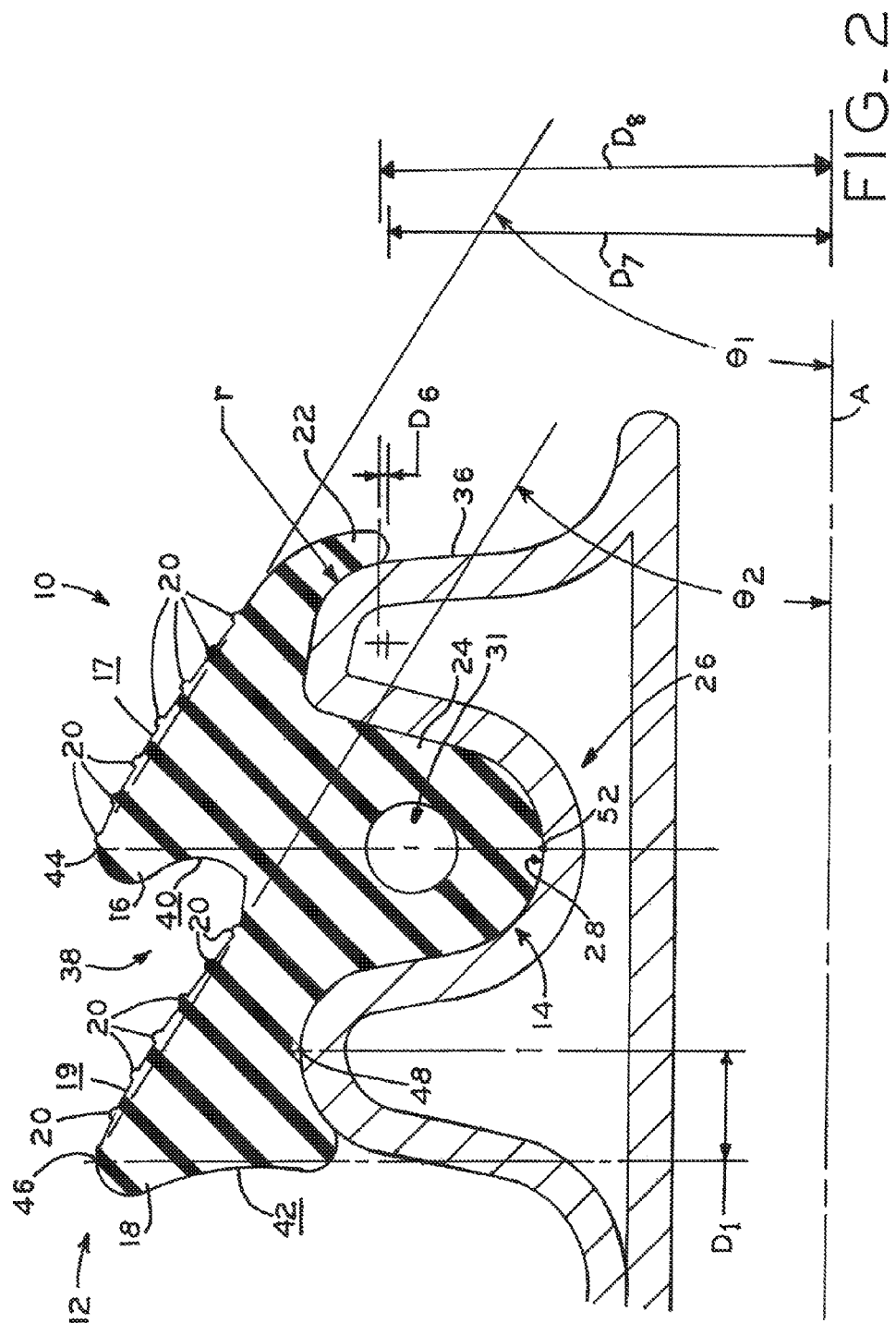
FIG. 2 is a an enlarged elevation, cross-sectional view of the gasket shown in FIG. 1.

As best seen in FIG. 2, gasket 10 generally includes a body having a sealing side 12 and an anchoring side 14. Sealing side 12 of the gasket body includes first lobe 16 and second lobe 18. First lobe 16 is located at a "front" or "upstream" location adjacent the axial end of spigot 32, while second lobe 18 is axially spaced from the axial end of spigot 32 and therefore can be said to be at a "rear" or "downstream" axial location relative to first lobe 16. For purposes of the present disclosure and with reference to FIG. 1, upstream structures are located at the right side of the figure and downstream structures are located at the left side. Thus, bell end 34 is upstream of spigot end 34. Upon assembly of bell end 34 to spigot end 32, first lobe 16 is initially contacted and deformed by bell end 34, followed by second lobe 18. Seal lobes 16 and 18 define front, or "leading" surfaces 17, 19 respectively which are the surfaces of primary sealing contact with inner surface 35 of bell end 34 (FIG. 4), and rear or "trailing" surfaces 40, 42 respectively which are opposite leading surfaces 17, 19 respectively.

In the illustrative embodiment of FIG. 2, leading surfaces 17, 19 each define a slightly convex profile as viewed in cross-section, but are otherwise generally linear and define leading surface angles $\theta_1$ and $\theta_2$, respectively. In particular, angles $\theta_1$ and $\theta_2$ are defined between a best-fit line to the cross-sectional profile of leading surfaces 17, 19, respectively, and longitudinal axis A defined by gasket 10 (which is also the longitudinal axis of spigot end 32 and bell end 34 of the corrugated pipe, owing to their mutual coaxiality). In an exemplary embodiment, angles $\theta_1$ and $\theta_2$ may be substantially equal to one another, and may each be as small as 20 degrees, 22 degrees, 25 degrees or 28 degrees, and as large as 32 degrees, 35 degrees, 37 degrees or 40 degrees, or may be any nominal value within any range defined by any of the foregoing values. In one exemplary embodiment, angles $\theta_1$ and $\theta_2$ are both equal to about 30 degrees, which represents a balance between ease of insertion of bell end 34 over spigot end 32 (facilitated by relatively lower nominal values of angles $\theta_1$ and $\theta_2$), and deflection and deformation of seal lobes 16, 18 sufficient to establish a reliable and robust fluid-tight seal (facilitated with relatively higher nominal values of $\theta_1$ and $\theta_2$).

A void or trough 38 is formed between first seal lobe 16 and second seal lobe 18, as best seen in FIG. 2. When gasket 10 is deformed and compressed into its sealing configuration as shown in FIG. 4, first lobe tip 44 is deflected into the area of trough 38. Concave trailing surface 40 further facilitates the intended deflection of first lobe tip 44 radially inwardly, and rearwardly, such that substantially all of leading surface 17 bears against inner surface 35 of bell end 34 to create a fluid-tight seal. Similarly, second concave trailing surface 42 of second seal lobe 18 facilitates deflection of second lobe tip 46 into the open space behind (i.e., axially downstream of) seal lobe 18, such that substantially all of leading surface 19 also bears against inner surface 35 of bell end 34 to create a second, redundant fluid-tight seal. In this way, gasket 10 provides two independent seals which can meet specifications calling for two seals in corrugated pipe applications.

In the exemplary embodiment of FIG. 2, leading surfaces 17 and 19 each include a plurality of mutually spaced, annular nodules 20 which allow a relatively smaller surface area of the lobes to initially contact bell end 34 of a pipe, as compared to a corresponding larger surface area which would contact bell end 34 of the pipe in the absence of nodules 20. This reduced initial contact lowers the initial insertion force required to install bell end 34 onto spigot end 32 with gasket 10. As first and second seal lobes 16 and 18 deform into their final sealing configurations, nodules 20 deform such that substantially all of leading surfaces 17 and 19 contact inner surface 35 of bell end 34. At this point, nodules 20 each provide a focused point of high-pressure sealing contact between lobes 16, 18 and the adjacent inner surface 35 of bell end 34, thereby facilitating a robust seal.

The axial positioning and configuration of lobe apexes or tips 44, 46 relative to other structures and features of gasket 10 and anchoring corrugation 26 promotes and facilitates a desired deformation and compression of gasket 10 when placed into the sealing configuration between spigot end 32 and bell end 34 (FIG. 4). In particular, first lobe tip 44 is placed directly above aperture 31 while second lobe tip 46 is spaced behind the peak of the adjacent corrugation. As described in detail below, this arrangement facilitates substantial deformation of gasket 10 while preserving a large-area, consistent sealing contact between leading surfaces 17, 19 of seal lobes 16, 18 and the adjacent inner surface 35 of bell end 34.

Turning again to FIG. 2, the axial position of first lobe tip 44 is illustrated by a line perpendicular to longitudinal axis A and extending radially inwardly from lobe tip 44. Because lobe tip 44 is directly above aperture 31, the line substantially bisects aperture 31. In addition, because aperture 31 is centered in anchoring portion 24, the line also bisects anchoring portion 24 and passes through nadir 52 of anchoring groove 28. In one exemplary embodiment, lobe tip 44 may be axially upstream or axially downstream of the center point of aperture 31 and nadir 52 by as little as zero inches (i.e., directly aligned), 0.005 inches or 0.010 inches, or as much as 0.015 inches, 0.020 inches or 0.025 inches, or can be any deviation within any range defined by any of the foregoing values. This axial alignment of lobe tip 44 with anchoring portion 24 ensures that, as lobe 16 deforms and compresses from its at-rest configuration (FIG. 2) to its deformed configuration (FIG. 4), lobe 44 migrates into trough 38 and puts pressure on the top portion of anchoring portion 24. The resulting material deformation and compression within the material of anchoring portion 24 substantially closes of aperture 31 such that aperture 31 is "flattened" or collapsed from its round cross-section, as illustrated in FIG. 4. This collapse of aperture 31 from the undeformed cross section (FIG. 2) to the deformed cross-section (FIG. 4) substantially reduces the area of aperture 31, by, e.g., about 50%. In an exemplary embodiment, such area reduction of aperture 31 may be as little as 40%, 43%, 46% or 49%, and as much as 51%, 54%, 57% or 60%, or can be any reduction within any percentage range defined by any of the foregoing values.

The migration of seal lobe 16 into trough 38, and the subsequent deformation of anchoring portion 24, allows leading surface 17 to deform from its angled configuration shown in FIG. 2 to its deformed configuration shown in FIG. 4. This ensures that substantially all of leading surface 17 remains in firm and even pressure contact with inner surface 35 of bell end 34, as shown in FIG. 4. As noted above, localized areas of increased sealing pressure resulting from the deformation of nodules 20 may also be present along leading surface 17 to promote an even more redundant and robust seal.

Second lobe tip 46 of second seal lobe 18 is axially spaced rearwardly (i.e., upstream) of the peak point 48 of the rear portion of anchoring corrugation 26 by a distance $D_1$. For purposes of the present disclosure, a "tip" of a seal lobe is considered to be the point of maximum radial distance from longitudinal axis A for the given lobe structure, as shown in FIG. 2 and described herein with respect first and second seal lobes 16 and 18. Similarly, peak point 48 of the rear portion of corrugation 26 is the point of maximum radial distance of the rear portion of corrugation 26 from longitudinal axis A, and the front portion of corrugation 26 has a similarly defined peak point. In the context of gasket 10, peak point 48 refers to the convex inwardly facing surface of second seal lobe 18, i.e., the portion of seal lobe 18 that is sized and configured to engage the rear portion of corrugation 26. References to longitudinal axis A of gasket 10 alone (i.e., without reference to its installed position upon spigot end 32), refer to the longitudinal axis of gasket 10 itself in its as-manufactured, at rest state, shown as gasket 10' in FIG. 1 and further described below. Thus, referring only to gasket 10 (and not to corrugation 26), peak point 48 is also the point of maximum radial distance from longitudinal axis A this lower convex surface of lobe 18. Lobe 16 defines a similar peak point.

In an exemplary embodiment, the axial distance $D_1$ between peak point 48 and lobe tip 46 may be as little as 0.20 inches, 0.22 inches, or 0.25 inches, or as large as 0.26 inches, 0.28 inches, or 0.30 inches, or may be any distance within any range defined by any of the foregoing nominal values. This "rearward" axial spacing of lobe tip 46 places lobe tip axially rearward of anchoring portion 24 and the rear portion of corrugation 26, and thereby facilitates and promotes migration of lobe tip 46 into the open space behind second seal lobe 18 upon installation of bell end 34 over spigot end 32. Similar to leading surface 17 of seal lobe 16, this migration ensures that substantially all of leading surface 19 of second seal lobe 18 remains in firm and even pressure contact with inner surface 35 of bell end 34, with localized areas of increased sealing pressure from nodules 20.

As noted above and shown in FIG. 2, gasket 10 includes anti-roll lip 22 extending from first seal lobe 16 toward anchoring side 14. Anti-roll lip 22, as shown in FIG. 2, engages the leading surface 36 of an anchoring corrugation 26 to resist any tendency for gasket 10 to "roll out" of its seated position within anchoring corrugation 26 when bell end 34 is inserted over spigot end 32 (FIG. 4). In particular, the extent to which anti-roll lip 22 protrudes radially downwardly toward longitudinal axis A controls the extent to which anti-roll lip 22 resists "rolling" of gasket 10 out of its seated position as bell end 34 is installed. That is, extending anti-roll lip 22 radially inwardly and downwardly along leading wall 36 of corrugation of 26 increases the resistance of gasket 10 to "rolling" out of place from pressure on leading surface 17, 19 by inner surface 35 of bell end 34. However, as described in further detail below with respect to installation and use of gasket 10, gasket 10 must also be expanded from an unstretched configuration (shown as gasket 10' in FIG. 1) to a stretched configuration (shown as gasket 10 in FIG. 1) in order to install gasket 10 on anchoring corrugation 26. Extension of anti-roll lip 22 radially inwardly and downwardly along leading wall 36 increases the amount of force that must be used to stretch gasket 10 from its unexpanded configuration to its expanded configuration.

Anti-roll lip 22 cooperates with the material properties and structural characteristics of gasket 10 to balance the competing priorities of providing anti-roll functionality while preserving manual installability of gasket 10. In particular, anti-roll lip extends radially inwardly and downwardly along leading surface 36 of corrugation 26 to a point approximately radially aligned with the center of the curve defining the upper portion of leading surface 36. Referring to FIG. 2, radius r of this curve is Shown, with the radial inward tip of lip 22 radially aligned with the center of radius r. In an exemplary embodiment, radial distance $D_6$ between the end, or tip, of lip 22 and the center of radius r corresponds to the difference between a distance $D_7$ between the end, or tip, of lip 22 and longitudinal axis A and a distance $D_8$ between radius r and longitudinal axis A, and may be as little as 0 inches, 0.025 inches, 0.040 inches or 0.050 inches in either direction (i.e., the tip of lip 22 may be above or below the center of radius r), and may be as large as 0.055 inches, 0.060 inches, 0.075 inches or 0.100 inches in either direction, or may be any distance within any range defined by any of the foregoing values.

Referring still to in FIG. 2, anchoring portion 24 is shaped to be inserted into, and substantially completely fill, the annular anchoring groove 28 in anchoring corrugation 26 of spigot end 32. Similar to nodules 20 on lobes 16, 18, the outer surface of anchoring portion 24 includes a number of mutually spaced annular nodules 30 (FIG. 3), such as five nodules 30 on each opposing side of anchoring portion 24 as illustrated. Nodules 30 that are compressed against the internal walls of anchoring groove 28 to aid in firmly securing anchoring portion 24 within the anchoring groove 28, thereby resisting potential for gasket 10 to roll or pull out of anchoring groove 28 when spigot end 32 is assembled to bell end 34.

As noted above and shown in FIG. 2, anchoring portion 24 further includes aperture 31, formed as an annular longitudinal void around the periphery of anchoring portion 24 and having a generally circular cross sectional shape. In the illustrated embodiment, aperture 31 is substantially centered in anchoring portion 24. Aperture 31 facilitates compression of anchoring portion 24 when gasket 10 is in its sealing configuration, as shown in FIG. 4. Similarly, aperture 31 cooperates with the relatively low durometer of gasket 10 to facilitate deformation of anchoring portion 24 to conform to anchoring groove 28 such that anchoring portion 24 reliably fills substantially all of groove 28. Moreover, it is appreciated that some variability in the size and geometry of spigot end 32 and anchoring corrugation 26 may occur depending, e.g., on the origins of the corrugated pipe to which gasket 10 is applied. Aperture 31 cooperates with relatively high compressibility of anchoring portion 24 to ensure that anchoring portion 24 will completely fill anchoring groove 28 regardless of any such variability.

2. Gasket Installation and Use

As noted above, gasket 10 is designed for use in conjunction with corrugated pipes. Referring to FIG. 1, two sections of such a corrugated pipe are shown including pipe spigot end 32 on one section and pipe bell end 34 on the next adjacent section. Pipe spigot end 32 includes a plurality of corrugations, with one corrugation 26 utilized as an anchoring corrugation having an anchoring groove 28 (FIG. 3) into which anchoring portion 24 of gasket 10 is received, as described in detail above. Anchoring corrugation 26 also includes a leading wall 36 which is engaged by anti-roll lip 22 as described above. In the illustrated embodiment, the pipe sections each further include a generally cylindrical fluid conduit 50 joined (e.g., by welding) to the corrugated outer portions. When spigot end 32 of one pipe section is fully received in bell end 34 of the adjacent pipe section, fluid conduits 50 may be aligned to facilitate a smooth fluid flow through the joined pipe sections.

Bell end 34 of a pipe has a generally cylindrical inner surface 35 which is engaged by seal lobes 16, 18 of gasket 10 to form a seal upon insertion of pipe spigot end 32 into pipe bell end 34. In FIGS. 1-3 and 5, seal lobes 16, 18 are shown in their undeformed state, as manufactured (and installed) but not yet deformed into their respective sealing configurations. When pipe bell end 34 and pipe spigot end 32 are assembled to one another with gasket 10 therebetween, seal lobes 16, 18 deform into their respective sealing configurations while the remainder of gasket 10 compresses to accommodate such deformation. FIG. 4 illustrates seal lobes 16, 18 (and the other portions of gasket 10) deformed into a sealing configuration when spigot end 32 of one pipe section is attached to bell end 34 of a second, adjacent pipe section.

FIG. 1 illustrates gasket 10' in its as manufactured, unstretched configuration defining unstretched diameter $D_U$ (as measured at the centroid of the cross-sectional area of gasket 10'). Upon installation to spigot end 32, gasket 10' is stretched, either manually or with the aid of a mechanical stretching device, to an expanded configuration sufficient to allow anchoring portion 24 to pass over the front portion of anchoring corrugation 26 and into anchoring groove 28. In this installed configuration, seal 10 defines an expanded diameter $D_E$ larger than unexpanded diameter $D_U$. The percentage increase in diameter for expanded diameter $D_E$ as compared to unexpanded diameter $D_U$ is referred to herein as the "stretch percentage", and is equal to $(D_E-D_U)/D_U$. In an exemplary embodiment and in view of an intended size for anchoring corrugation of spigot end 32, gasket 10' is designed for a stretch percentage of as little as 15%, 16%, or 17% and as large as 18%, 19%, or 20%, or any stretch percentage within any range defined by any two of the foregoing values. This range of stretch percentages is sufficiently low to maintain the overall shape and configuration of the cross-section of gasket 10 between its unexpanded configuration (gasket 10') and its expanded configuration (gasket 10), while also retaining substantial compressibility and deformability of gasket 10 between spigot end 32 and bell end 34, as shown in FIG. 4 and further described below.

Figure 3:
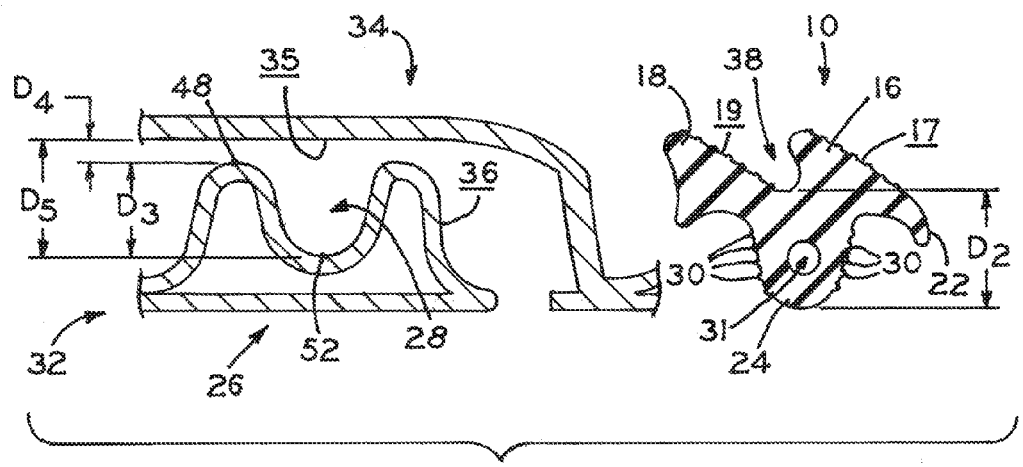
FIG. 3 is an exploded view of the corrugated pipe and gasket of FIG. 1, with the seal shown removed from an assembled pipe spigot and bell.

FIG. 3 illustrates bell end 34 received over anchoring corrugation 26 of spigot end 32, generally illustrating the shape and configuration of the space which receives the deformed gasket 10 (as shown in FIG. 4). In FIG. 3, gasket 10 is shown in its undeformed configuration to the right of the assembled spigot end 32 and bell end 34. Anchoring portion 24 of gasket 10 defines an overall radial extent, shown as distance $D_2$, extending from the radial innermost portion (i.e., the "bottom" or "nadir") of anchoring portion 24 to the radial innermost portion (i.e., the "bottom" or "nadir") of trough 38. The annular anchoring corrugation 26 defines radial distance $D_3$ from nadir 52 of anchoring grove 28 to peak point 48 of the rear portion of corrugation 26 (described in detail above). For purposes of the present discussion, nadir 52 is the radial innermost point of anchoring groove 28 relative to longitudinal axis A defined by spigot end 32 (FIG. 2). With bell end 34 received over spigot end 32 in a seated position as shown in FIG. 3, a further annular gap is formed which defines radial distance $D_4$ between peak point 48 of corrugation 26 and the adjacent cylindrical inner surface 35 of bell portion 34. Thus, as illustrated in FIG. 3, the total radial distance available to receive gasket 10 between nadir 52 of anchoring groove 28 and inner surface 35 of bell end 34 is distance $D_5$, which is equal to the sum of distance $D_3$ and distance $D_4$.

In the exemplary embodiment illustrated in FIG. 3, the radial extent (i.e., "height") of anchoring portion 24 of gasket 10, shown as distance $D_2$, is substantially equal to the corresponding overall radial extent (i.e., "height") of the gasket receiving space between nadir 52 of anchoring groove 28 and inner surface 35 of bell end 34, shown as distance $D_5$. That is, $D_2$ is substantially equal to $D_5$. In some instances, $D_2$ may be allowed to deviate from $D_5$ in either direction, i.e., $D_2$ may be more than or less than $D_5$ by a tolerance amount. In an exemplary embodiment, $D_2$ may deviate from $D_5$ by as little as zero inches (i.e., $D_5$ is exactly equal to $D_2$), 0.010 inches, 0.020 inches or 0.025 inches, or by as much as 0.030 inches, 0.035 inches, 0.040 inches or 0.050 inches, or $D_2$ may deviate from $D_5$ by any nominal value within any range defined by any two of the foregoing values.

Because distance $D_2$ is substantially equal to distance $D_5$, both first and second seal lobes 16 and 18 must substantially deform when bell end 34 is installed over spigot end 32, as shown in FIG. 4. As noted above and shown in FIG. 4, aperture 31 may collapse as illustrated, and the material of gasket 10 itself may compress such that gasket 10 occupies a lower overall cross-sectional area when compressed (FIG. 4) as compared to its uncompressed configuration (FIG. 3). This spatial configuration, together with the geometry and structures of gasket 10 as described herein, have been shown to withstand increased fluid pressures on gasket 10 while also preventing rollout of gasket 10 upon installation of bell end 34 over spigot end 32.

3. Gasket Sizing

Turning now to FIG. 5, gasket 10 is shown drawn to scale, according to scales 54 and 56 illustrating distances in inches. In an exemplary embodiment, gasket 10 is shaped and sized to be used in conjunction with corrugated pipes having fluid conduits 50 with a 12-inch nominal flow diameter. In such 12-inch corrugated pipes, the particular illustrated cross-sectional shape for gasket 10 has been shown to produce a robust fluid tight seal which also reliably remains in its installed location in anchoring corrugation 26 as bell end 34 is installed over spigot end 32.

However, it is contemplated that the features and principles applied to gasket 10 and described in detail above may also be used in conjunction with other sizes of corrugated pipes, which typically have alternative sizes and spatial geometries associated with the anchoring corrugation into which the gasket will be installed. For example, gasket 110 is illustrated in FIG. 5, drawn to scale according to scales 54 and 56. Gasket 110 has the same general set of features and structures used for gasket 10, but a slightly different overall cross-sectional profile suitable for use with a corrugated pipe having a nominal flow diameter of 18 inches. Gasket 110 is substantially similar to gasket 10 described herein, with reference numerals of gasket 110 analogous to the reference numerals used in gasket 10, except with 100 added thereto. Structures of gasket 110 correspond to similar structures denoted by corresponding reference numerals of gasket 10, except as otherwise noted herein.

As illustrated in FIG. 5, gasket 110 defines an overall axial length (i.e., the distance between the forward-most tip of anti-roll lip 122 and the rearward-most tip of second seal lobe 118) which is greater than the corresponding axial extent of gasket 10, in order to accommodate a particular corrugation geometry associated with an 18-inch corrugated pipe. In addition, trough 138 is generally deeper and more pronounced than trough 38 as illustrated, while the concave trailing surface 142 of second seal lobe 118 defines a more dramatic "v-shaped" divot along the rear surface of second seal lobe 118 as compared to concave trailing surface 42 of seal lobe 18.

Gasket 210 is also illustrated in FIG. 5, drawn to scale according to scales 54 and 56, and having the same general set of features and structures used for gaskets 10 and 110, but with further modified overall cross-sectional profile suitable for use with a corrugated pipe having a nominal flow diameter of 24 inches. Gasket 210 is substantially similar to gaskets 10 and 110 described herein, with reference numerals of gasket 210 analogous to the reference numerals used in gaskets 10 and 110, except with 200 and 100 added thereto respectively. Structures of gasket 210 correspond to similar structures denoted by corresponding reference numerals of gaskets 10 and 110, except as otherwise noted herein.

Similar to gasket 110, gasket 210 includes a longer overall axial extent as compared to gasket 10, together with a trough 238 which is more pronounced than trough 38 but less pronounced than trough 138. Gasket 210 also has a concave trailing surface 242 of second seal lobe 218 which is more pronounced than concave trailing surface 42 of gasket 10 but less than pronounced than the v-shaped concave trailing surface 142 of gasket 110.

Moreover, it is contemplated that the design features and principles used in gaskets 10, 110 and 210 are applicable to any nominal pipe diameter, and can be adapted to work in conjunction with any size and geometry of anchoring corrugation as required or desired for a particular application.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pipe assembly defining perpendicular axial and radial directions, comprising:
a pipe defining a longitudinal axis and having a spigot end with an annular corrugation, the corrugation including a front portion defining a front peak point, a rear portion defining a rear peak point, and a groove disposed between the front and rear portions and defining a nadir, the front portion defining a radius extending forwardly from the front peak portion and having a radius center defining a first radial distance from the longitudinal axis; and
an annular gasket separate from the pipe, the annular gasket having a body formed of a resilient material and including a sealing side and anchoring side, the gasket comprising:
an anchoring portion disposed at the anchoring side and extending radially inwardly, the anchoring portion received in the groove of the pipe;
a first seal lobe disposed at the sealing side and defining a first lobe tip; and
an anti-roll lip positioned forward of the first seal lobe;
the gasket having an uninstalled condition in which the gasket is not connected to the pipe, with the anti-roll lip extending radially inwardly toward said anchoring side; and
the gasket having an installed condition in which the gasket is stretched around the annular corrugation of the pipe in a tensioned condition, with the anti-roll lip extending radially inwardly toward said anchoring side in a direction toward the longitudinal axis along and over a leading surface of the front portion of the annular corrugation to an anti-roll lip tip, the anti-roll lip tip having a second radial distance from the longitudinal axis that is substantially equal to the first radial distance from the radius center to the longitudinal axis.

2. The pipe assembly of claim 1, wherein the first radial distance deviates from the second radial distance by between zero inches and 0.100 inches.

3. The pipe assembly of claim 1, wherein the gasket further comprises a second seal lobe disposed at the sealing side and defining a second lobe tip, the first seal lobe and the second seal lobe axially spaced from one another to define a trough therebetween, and wherein the second lobe tip is axially spaced rearwardly of the rear peak point of the annular corrugation by an axial distance between 0.20 inches and 0.30 inches.

4. The pipe assembly of claim 3, Wherein at least one of the first seal lobe and the second seal lobe defines a leading surface including a plurality of mutually spaced, annular nodules.

5. The pipe assembly of claim 1, wherein:
the annular gasket defines an unstretched diameter in an as-manufactured, unstretched state and a stretched diameter when the annular gasket is disposed on the annular corrugation, and
the unstretched diameter is between 15% and 20% smaller than the stretched diameter.

6. The pipe assembly of claim 1, wherein the annular gasket is formed as a single monolithic part of substantially uniform density.

7. The pipe assembly of claim 6, wherein the annular gasket has a durometer between 40 and 55 as measured on a shore A scale.

8. The pipe assembly of claim 7, wherein the annular gasket is made of an extruded rubber material including at least one of isoprene, ethylene propylene diene monomer rubber (EPDM), neoprene, nitrile rubber, thermoplastic elastomer rubber, thermoplastic vulcanized rubber (TPV), silicone, ethylene propylene (EPM), and a mixture of cross-linked EPDM rubber and polypropylene.

9. The pipe assembly of claim 1, wherein the anchoring portion of the annular gasket substantially fills the groove of the pipe.

10. The pipe assembly of claim 1, wherein the anchoring portion includes an annular aperture formed therein.

11. A pipe assembly defining perpendicular axial and radial directions, comprising:
a first pipe having a spigot end with an annular corrugation including a front portion defining a front peak point, a rear portion defining a rear peak point, and a groove disposed between the front and rear portions and defining a nadir;
a second pipe having an annular bell end with an annular inner surface, the first pipe and the second pipe defining a gasket receiving space having a receiving space radial extent between the nadir of the groove and the annular inner surface of the annular bell end when the first pipe is assembled to the second pipe; and
an annular gasket disposed on the annular corrugation, the gasket having a body formed of a resilient material and including a sealing side and anchoring side, the gasket comprising:
an anchoring portion disposed at the anchoring side and extending radially inwardly, the anchoring portion received in the groove of the first pipe;
a first seal lobe disposed at the sealing side; and
a second seal lobe disposed at the sealing side, the first seal lobe and the second seal lobe axially spaced from one another to define an anchoring portion trough of the gasket disposed between the first and second sealing lobes, wherein the anchoring portion includes an anchoring portion radial extent is a distance from a nadir of the anchoring portion trough to a nadir of the anchoring portion;
the anchoring portion radial extent substantially equal to the receiving space radial extent, whereby the nadir of the anchoring portion and the nadir of the groove are in abutment, and the first seal lobe and the second seal lobe must substantially deform and compress when the gasket is in a sealing configuration in the gasket receiving space; and
the first and second sealing lobes having tapered surfaces extending radially outwardly from the anchoring portion wherein, when the first and second pipes are connected, the sealing surfaces are compressed into a substantially flattened configuration along a direction perpendicular to the anchoring portion.

12. The pipe assembly of claim 11, wherein:
the first seal lobe of the annular gasket defines a first lobe tip axially aligned with the anchoring portion;
the second seal lobe defines a second lobe tip axially rearward of the anchoring portion; and
the first seal lobe is deformed into the trough and the second seal lobe is deformed into a space behind the annular corrugation when the annular bell end of the second pipe is assembled to the spigot end of the first pipe.

13. The pipe assembly of claim 11, wherein the annular gasket is formed as a single monolithic part of substantially uniform density.

14. The pipe assembly of claim 13, wherein the annular gasket has a durometer between 40 and 55 as measured on a shore A scale.

15. The pipe assembly of claim 14, wherein the annular gasket is made of an extruded rubber material including at least one of isoprene, ethylene propylene diene monomer rubber (EPDM), neoprene, nitrile rubber, thermoplastic elastomer rubber, thermoplastic vulcanized rubber (TPV), silicone, ethylene propylene (EPM), and a mixture of cross-linked EPDM rubber and polypropylene.

16. The pipe assembly of claim 11, wherein the anchoring portion of the annular gasket substantially fills the groove of the pipe.

17. The pipe assembly of claim. 11, wherein the anchoring portion includes an annular aperture formed therein.

18. The pipe assembly of claim 11, wherein at least one of the first seal lobe and the second seal lobe defines a leading surface including a plurality of mutually spaced, annular nodules.

19. The pipe assembly of claim 11, wherein the receiving space radial extent deviates from the anchoring portion radial extent by between zero and 0.050 inches.

* * * * *